United States Patent [19]

Wagner et al.

[11] Patent Number: 4,464,577
[45] Date of Patent: Aug. 7, 1984

[54] TURBINE SPEED CONTROL

[75] Inventors: James B. Wagner, Peabody; Harvey H. Chamberlain, Marblehead, both of Mass.

[73] Assignee: General Electric Company, Lynn, Mass.

[21] Appl. No.: 389,608

[22] Filed: Jun. 18, 1982

[51] Int. Cl.³ .............................................. H02P 9/04
[52] U.S. Cl. .............................. 290/40 A; 290/40 R; 290/40 D
[58] Field of Search ................ 290/40 A, 40 D, 40 R

[56] References Cited

U.S. PATENT DOCUMENTS

| | | | |
|---|---|---|---|
| 3,643,437 | 2/1972 | Birnbaum et al. | 290/40 X |
| 3,826,095 | 7/1974 | Conrad, Jr. et al. | 290/40 X |
| 3,829,232 | 8/1974 | Fieglein et al. | 290/40 A X |
| 3,928,975 | 12/1975 | Braytenbah | 290/40 R X |
| 3,931,714 | 1/1976 | Jaegtnes et al. | 290/40 R X |
| 4,035,624 | 7/1977 | Lardi | 290/40 R X |
| 4,071,897 | 1/1978 | Groves, Jr. et al. | 290/40 A X |

Primary Examiner—J. V. Truhe
Assistant Examiner—Paul Shik Luen
Attorney, Agent, or Firm—James W. Mitchell

[57] ABSTRACT

A control system for a prime mover may include a proportional speed control, a primary overspeed control and an emergency overspeed control. The proportional speed signal is obtained from select highest value logic, whereas overspeed and loss of speed signals are submitted to two out of three logic and two out of four logic, respectively. A passive emergency overspeed channel is provided in combination with the primary overspeed channel to respective de-energize and energize trip relays connected to electrohydraulic trip devices.

6 Claims, 6 Drawing Figures

TURBINE SPEED CONTROL

This invention relates, in general, to the speed control of prime movers and, in particular, to the speed control of prime movers during normal, overspeed and emergency overspeed conditions.

Prime movers operate under the control of large in line fluid control valves which regulate the flow of motive fluid into the prime mover. These fluid control valves may include a stop valve and a control valve positioned in series in a steam header upstream from the steam turbine. The control valve may be set to any intermediate position between full open and full close whereas the stop valve is usually full open or full close. The earliest speed control devices for prime movers were strictly mechanical and were called fly-ball governors. As the size of prime movers increased, the fly-ball governor was enhanced by fluid operated relays and so mechanical hydraulic control entered the marketplace. One aspect of mechanical hydraulic control is the use of an overspeed bolt and trip finger. The latter comprised a shaft mounted bolt, spring biased in the radial direction, which would emerge from the rotor in the radial direction as speed increased until it actuated a trip finger or trip lever to cause the turbine valves to trip close.

The mechanical hydraulic control is gradually being replaced by an electrohydraulic control which replaces fly-ball governors with a magnetic pick-up and toothwheel to provide speed feedback information into an electric control. However, it was still deemed to be prudent to retain the overspeed bolt and trip finger in the control system for so-called emergency overspeed conditions. Overspeed occurs whenever the prime mover exceeds its rated speed. Primary overspeed may occur at 110 percent of rated speed whereas emergency overspeed may occur artibrarily at 112 percent of rated speed.

U.S. Pat. No. 3,242,346 to Skoubo shows the use of silicon controlled rectifier to be used primarily as an overspeed control for a prime mover. This represents one aspect of the applicants' invention but does not provide for proportional control or pre-emergency overspeed control.

SUMMARY OF THE INVENTION

The present invention provides a multi-level speed control for a prime mover; for example, a steam turbine. The included controls are proportional speed, overspeed and emergency overspeed. In addition, loss of signal logic is also provided as a trip function. The emergency overspeed is a passive circuit which is externally energized and is set to de-energize upon a trip signal. The primary overspeed circuit is arranged so that it must be energized to trip due to either primary overspeed or loss of signal.

OBJECTS OF THE INVENTION

It is an object of this invention to provide an all electronic turbine speed control package.

It is an object of this invention to obviate the use of an overspeed bolt and trip finger.

It is an object of this invention to provide a primary overspeed trip which energizes a relay to trip and an emergency overspeed trip which de-energizes to trip.

Finally it is another object of the present invention to provide an improved control system which is fail safe and which is less susceptible to false trips.

The novel features believed characteristic of the present invention are set forth in the claims. The invention itself, however, together with further objects and advantages thereof may be best understood with reference to the following description taken in connection with the appended drawings.

DETAILED DESCRIPTION OF THE INVENTION

Figure 1:
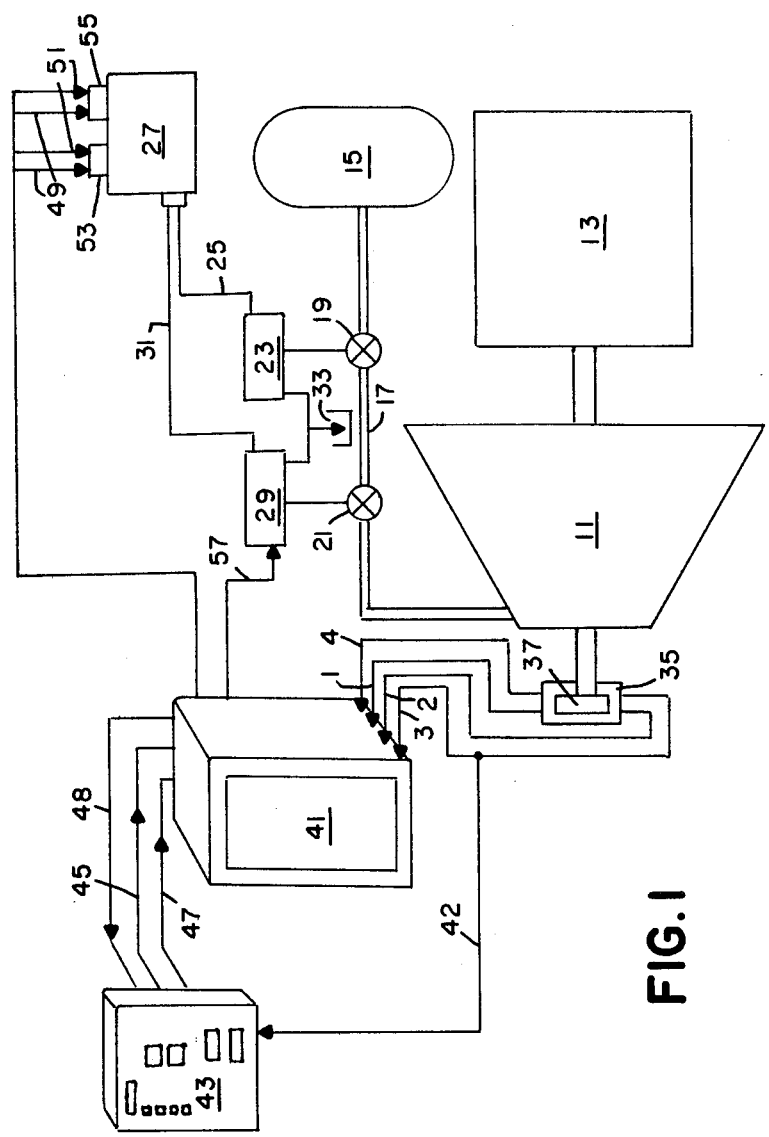
FIG. 1 is block diagram of a prime mover speed control system is accordance with the present invention.

FIG. 1 shows a schematic arrangement of a control system for a prime mover omitting those elements not essential to the functioning of the control system. A prime mover or turbine 11 is connected to a load 13 which may be either electrical or mechanical. A steam generator 15 provides motive fluid to the steam turbine through a steam header pipe 17. The steam header pipe also includes, in line and in series a stop valve 19 and a control valve 21 to regulate the flow of steam into the steam turbine. The stop valve is positioned by means of a hydraulic actuator 23 which is supplied with high pressure hydraulic fluid through pipe 25 from oil reservoir 27. The control valve 21 is positioned by means of a hydraulic actuator 29 which is supplied with high pressure hydraulic fluid through pipe 31 from the oil reservoir. The two hydraulic actuators are shown connected to drain 33.

The speed sensing or speed feedback portion of the control system is partially contained in the turbine front standard 35 which encloses a toothed wheel 37 driven by the steam turbine. A plurality of redundant speed pick-ups 1, 2, 3 and 4 provide three primary speed signals 1, 2 and 3; and, one emergency overspeed signal 4. The four speed signals are input into a control cabinet 41 which houses the electronics associated with the speed control system as shown in greater detail in FIG. 2. One of the speed feedback signals 3 may be tapped line 42 to provide a driver signal for a display which is contained on the operator panel 43. The operator panel enables the turbine operator to input operational commands such as speed set or load set into the control cabinet on line 45 and 47 respectively. Cable 48 provides a speed or load set feedback to the operator's panel. The outputs of the control cabinet includes first and second primary trip signals 49 and first and second emergency trip signals 51. Emergency trip devices (ETD's) 53 and 55 are each mounted on the hydraulic manifold and may be de-energized to trip in a manner described in connection with FIGS. 2 and 4. The speed-load control signal (S/L) is communicated to the control valve hydraulic actuator on line 57 to provide proportional control for the turbine.

Figure 2:
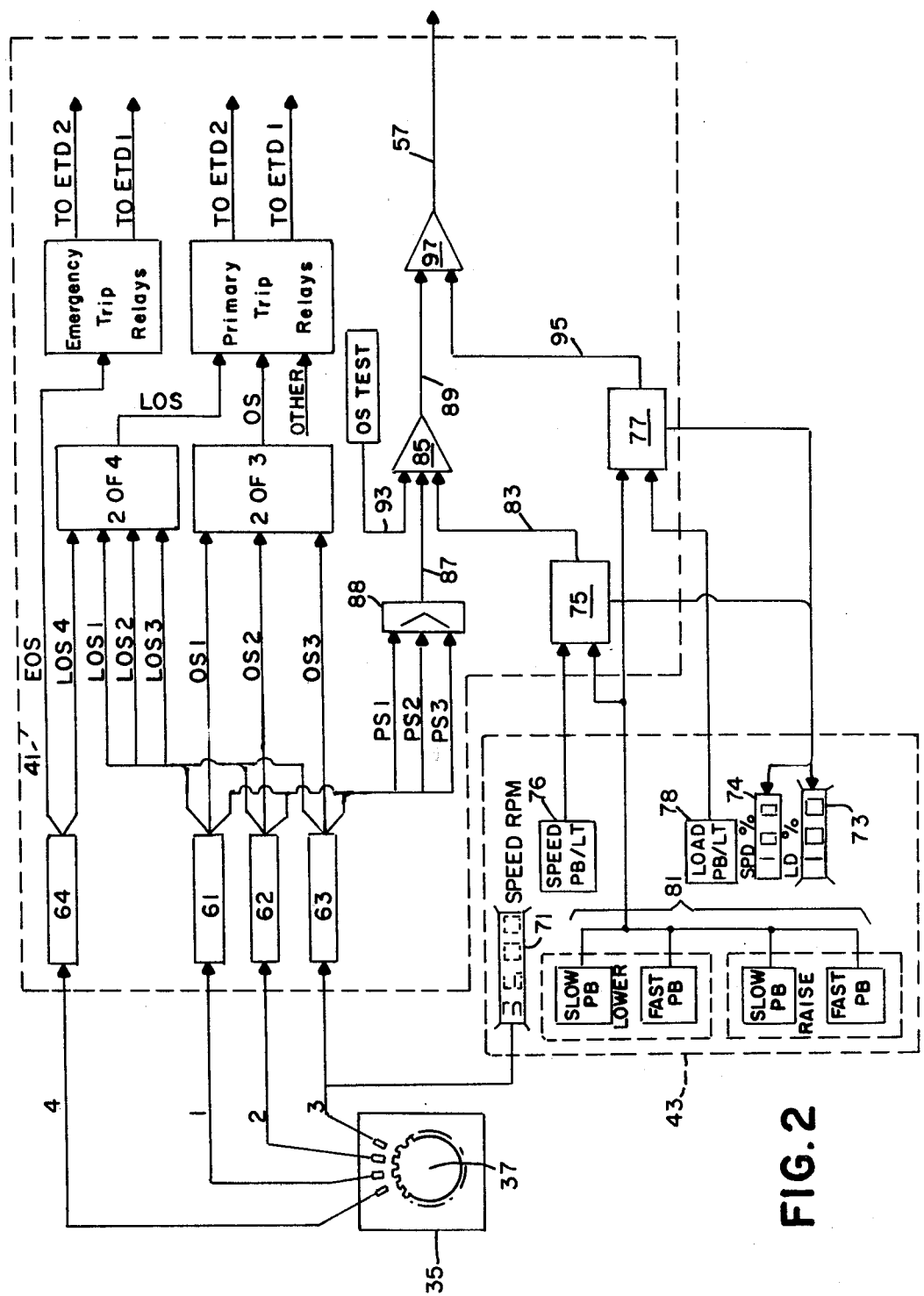
FIG. 2 is a signal flow diagram of a prime mover speed control system including the control cabinet, operators panel and input/output signals.

Referring to FIG. 2, the plurality of speed pick-ups, 1, 2, 3 and 4 are shown in proximity to the toothed wheel. Each of the speed signals is a pulse train output having a frequency proportional to speed. The control cabinet is shown in outline at 41 and the operator's panel is shown in outline at number 43.

Speed signals 1, 2 and 3 are each input into one of three identical speed translators 61, 62 and 63 respectively which provide three functional outputs comprising proportional speed PS, overspeed OS and loss of signal LOS. Since the speed translators are all identical, the description given applies to all three speed translators. Each speed translator provides an output voltage proportional to speed on lines PS1, PS2 and PS3. Further each speed translator provides an overspeed signal on lines OS1, OS2 and OS3. The overspeed signals may be generated by a comparison of actual speed with a threshold overspeed (e.g., 110 percent of rated speed) to generate a voltage signal and corresponding contact closure if primary overspeed is reached. Finally, each speed translator provides a loss of signal output LOS1, LOS2 and LOS3 whenever the actual speed signal falls below some low threshold value and this also results in a contact closure.

Figure 3:
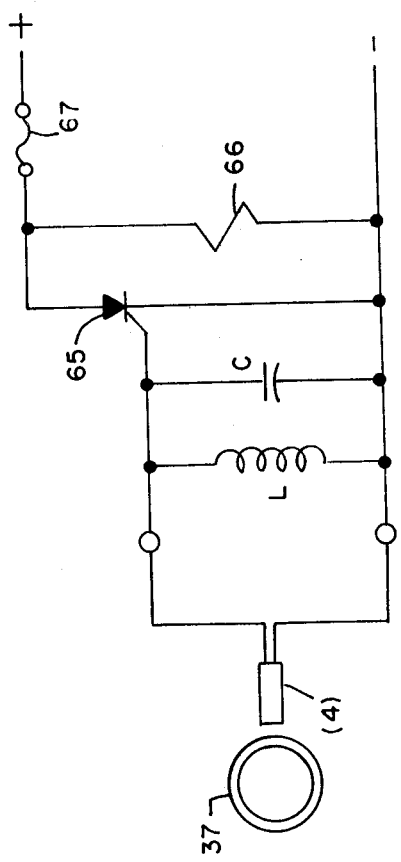
FIG. 3 is an electrical schematic of the emergency overspeed circuit.
Figure 3A:
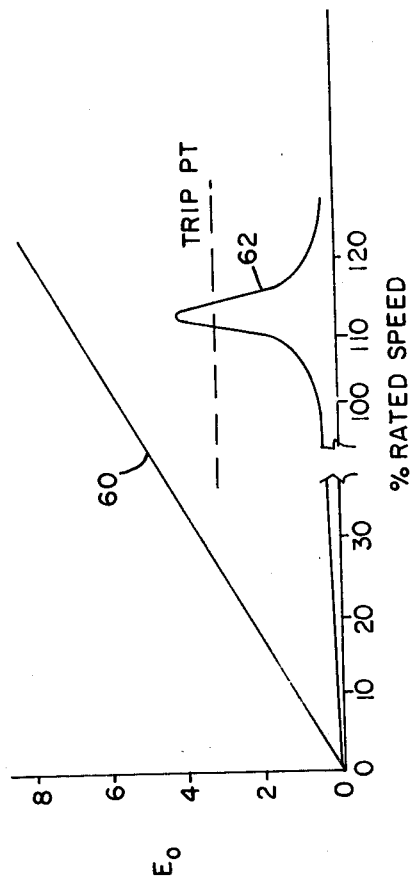
FIG. 3A is a graph which shows the output of the emergency overspeed circuit as turbine speed increases.

Speed signal 4 is input into an emergency overspeed channel which includes speed translator 64 more fully explained in connection with FIG. 3. Referring for the moment to FIG. 3, the emergency overspeed circuit is illustrated schematically as well as in accompanying FIG. 3A which shows the operation of the emergency overspeed circuit. In FIG. 3, probe 4 is closely adjacent the rotating tooth wheel 37. The signal output of the probe (4) is input into a turned "LC" circuit comprising the inductance coil L, capacitor C and silicon controlled rectifier (SCR) 65. The circuit is shown as connected to a normally energized solenoid 66. At the tuned frequency, the LC circuit resonates to cause the SCR 65 to fire thereby opening relay 67 and de-energizing solenoid 66. The significance of this circuit as used in combination with a turbine speed control is that it is speed sensitive not voltage sensitive. This is shown in FIG. 3A wherein line 60 represents a straight line relation between speed and voltage whereas curve 62 is characteristic of the LC circuit output. The turned LC circuit is advantageous because of its passive elements which are reliable and its narrow bandwidth of performance which makes it less susceptible to false trips. The emergency overspeed signal is identified as EOS whereas the loss of signal for the emergency overspeed channel is designated LOS4. The LOS4 signal is derived in a manner similar to the other loss of signal channels heretofore described.

Referring to FIG. 2, the operators panel 43 includes a turbine speed indicator 71. Indicator 73 displays information regarding the percent of actual turbine load relative to its respective setpoint. Likewise indicator 74 shows similar information relating to speed setpoint. The speed or load setpoint may be entered into either a speed setpoint register 75 or a load setpoint register 77 in the control cabinet dependent upon selection of a permissive pushbutton 76 or 78 and operation of one of the slow/fast-raise/lower pushbuttons 81 as shown. The speed set signal on line 83 is input into a comparator amplifier 85 for comparison with the proportional speed feedback signal on line 87 to produce a speed error signal on line 89. The proportional speed feedback signal is chosen from signals PS1, PS2 or PS3 through high value gate 88. An overspeed test signal (OS TEST) signal for the proportional speed circuit; i.e., the control valve may also be input into amplifier 85 on line 93. This signal is used as a test signal for the proportional speed channel. The speed error signal on line 89 is compared with the load set signal on line 95 in comparator amplifier 97 to output a valve position signal or speed/load control signal heretofore identified by the numeral 57 in FIG. 1. The means to convert a speed signal into valve position signal comprise at least one comparator amplifier for comparing a speed set signal with a speed feedback signal.

Figures 4, 4A:
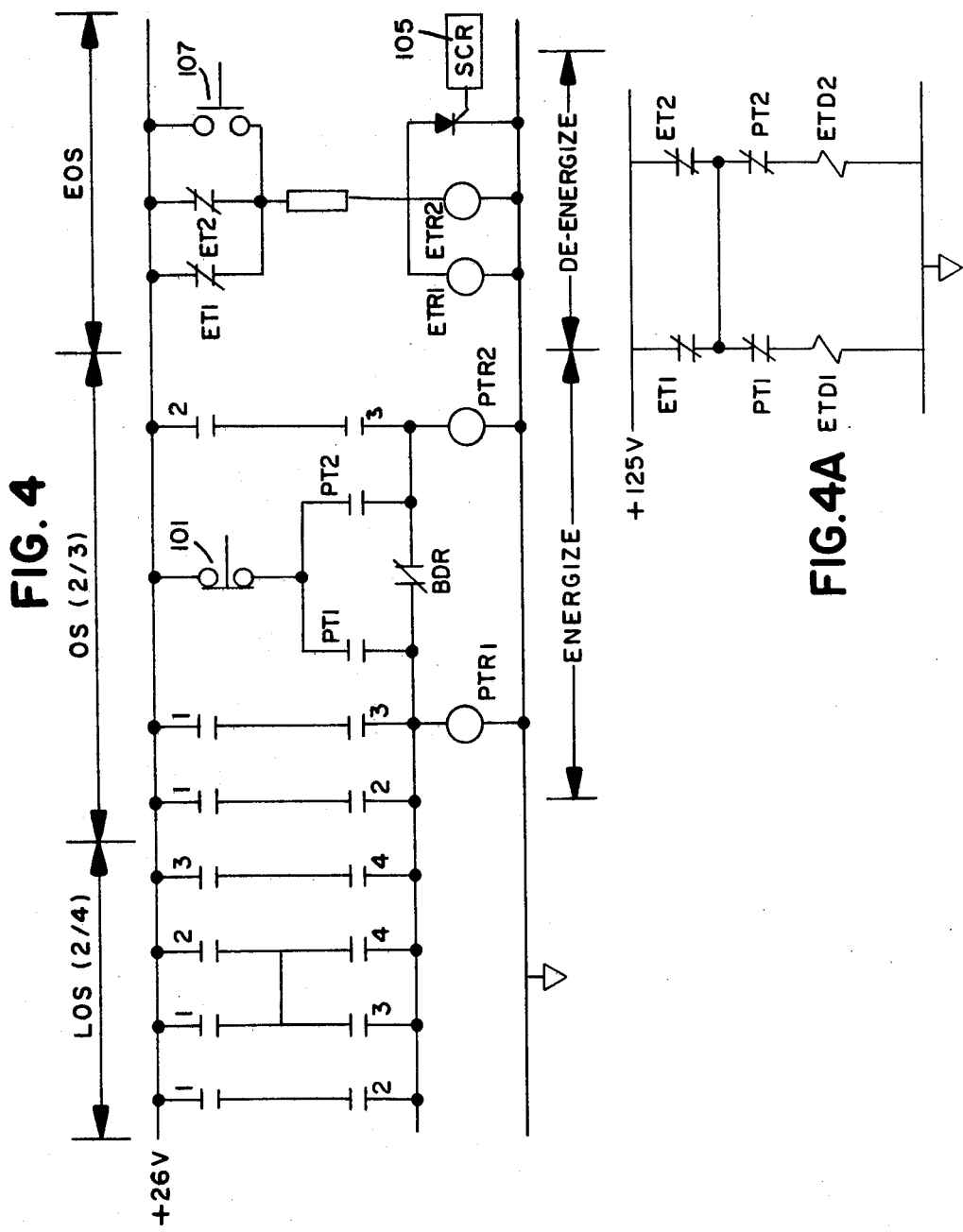
FIG. 4 is a logic schematic of the overspeed, loss of signal and emergency overspeed functions including the primary trip relays and the emergency overspeed trip relays.
FIG. 4A is a logic schematic of the trip relay contacts and the emergency trip devices.

The primary overspeed control includes 2 out of 3 logic contacts, 2 electrical energize to trip relays, a split bus and a de-energize to trip electrical trip device. FIG. 4 shows the relay logic for the loss of signal (LOS) function, two out of four logic; the primary overspeed (OS) function, two out of three logic; and the emergency overspeed (EOS) function one out of two. In the primary overspeed section (OS) any two out of three contact closure; i.e., 1, 2; 1, 3; or 2, 3 will cause relays PTR 1 and PTR 2 to energize through bus divider relay BDR which is normally closed. The bus divider relay BDR is used for test purposes in that each relay may be tested individually while the other relay remains on line. As the PTR relays become energized so do contacts PT1 and PT2 to "latch in" the relays until reset button 101 is opened. This prevents the relays from de-energizing as the turbine slows in response to the tripped condition.

Similarly loss of signal contacts 1, 2; 1, 3; 2, 4; and 3, 4 will close in response to an abnormally low signal. The logic shown in 2 out of 4 logic which includes a tie 103 between contacts 1, 3 and 2, 4. Closure of 2 out of 4 contacts will result in the energizing of primary trip relays (PTR). The logic employed is energize to trip logic.

In the emergency overspeed (EOS) section a deenergize to trip philosophy is used requiring a single trip signal but utilizing redundant components for reliability. If an emergency overspeed occurs, the SCR circuit 105 will fire, shorting out the relays ETR1 and ETR2 thereby opening contacts ET1 and ET2 until reset button 107 is closed to re-energize the relays. The redundant configuration is used so that should one relay fail, a false trip will be averted while the failed relay is under repair.

FIG. 4A shows an electrical schematic of the power circuit to the electrical trip devices. ETD1 and 2. All contacts are shown the normal state when the turbine is in operation. Either of the ETD's can cause the turbine to trip if de-energized although the normal trip mode is for both ETD's to de-energize. With respect to the emergency overspeed circuit EOS an overspeed signal would short out relays ETR1 and ETR2 causing contacts ET1 and ET2 in FIG. 4 to open. Likewise contacts ET1 and ET2 in FIG. 4A will open causing the ETD's to de-energize. If there were a failure of one relay, the ETD's would remain energized through a parallel signal path. For the normally closed contacts PT1 and 2 associated with the ETD circuit shown in FIG. 4A either side can trip its respective ETD thereby closing the turbine valves. Thus it is clear from FIG. 4A that the emergency trip contacts will trip in an AND configuration whereas the primary trip contacts will trip in an AND/OR configuration.

The operation of the control system in accordance with the present invention is as follows. Under normal operating conditions control of the prime mover is under the influence of the control valve and proportional speed channel. The proportional speed channel is protected by its own overspeed circuit and the loss of signal channel which requires 2 out of 4 signals to trip. If a primary overspeed condition develops; i.e., 110 percent of rated speed the primary overspeed channel will trip the turbine if a 2 out of 3 signal configuration results. Likewise loss of signal protection is still in force. If an emergency overspeed condition develops; i.e., 112 percent of rated speed the emergency overspeed protection circuit will trip the turbine. The primary energize to trip relays allow the trip signal path to operate in a de-energized mode until needed while the emergency trip relays are configured in a back-up fail-safe mode. Moreover the emergency overspeed channel includes a passive speed translator and redundant trip relays to obviate trips due to trip relay failure.

While there has been shown what is considered to be a preferred embodiment of the invention, it is recognized that other modifications may be made therein, and it is intended to cover all such modifications as fall within the true spirit and scope of the invention.

What we claim is:

1. A control system for a prime mover including channels for normal, overspeed and emergency overspeed speed control of the prime mover comprising:
   a plurality of "n" identical speed pick-ups receiving signals in parallel from said prime mover;
   a plurality of "n−1" speed translators each receiving a separate speed signal from a respective speed pick-up and each speed translator providing a proportional speed output, a primary overspeed output and a loss of signal output;
   an additional speed translator receiving a separate speed signal from its respective speed pick-up and providing an emergency overspeed output and a loss of signal output;
   a first logic circuit receiving all of said loss of signal outputs to provide a single loss of signal trip signal when said logic requirements are met;
   a second logic circuit receiving all of said primary overspeed outputs to provide a single primary overspeed trip signal where said logic requirements are met;
   a gating logic connected to said proportional speed outputs and providing a single proportional speed output and means converting said speed output into a valve position signal; and,
   at least one primary trip relay connected to said first and second logic outputs; and,
   at least one emergency trip relay connected to said emergency overspeed.

2. The control system recited in claim 1 wherein the additional speed translator includes a silicon controlled rectifier and tuned electrical circuit which causes a trip signal only at or about the emergency overspeed trip point.

3. The control system recited in claim 1 wherein said first logic circuit requires two out of four signals to trip.

4. The control system recited in claim 1 wherein said second logic circuit requires two out of three signals to trip.

5. The control system recited in claim 1 wherein there are two redundant primary trip relays connected to said first and second logic circuits and failure of one primary trip relay does not cause a false trip.

6. The control system recited in claim 1 wherein there are two redundant emergency trip relays connected to said emergency trip signal channel and failure of one redundant emergency trip relay does not cause a false trip.

* * * * *